United States Patent
Zhang et al.

(10) Patent No.: US 7,307,121 B2
(45) Date of Patent: Dec. 11, 2007

(54) SILICA CONTAINING RUBBER COMPOSITION

(75) Inventors: Ping Zhang, Hudson, OH (US); Sun-Lin Chen, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 389 days.

(21) Appl. No.: 10/805,457

(22) Filed: Mar. 19, 2004

(65) Prior Publication Data

US 2005/0209370 A1    Sep. 22, 2005

(51) Int. Cl.
| | |
|---|---|
| C08K 3/36 | (2006.01) |
| C08K 5/54 | (2006.01) |
| B05D 3/10 | (2006.01) |
| C08L 83/06 | (2006.01) |
| B60C 11/00 | (2006.01) |
| B08K 3/00 | (2006.01) |

(52) U.S. Cl. .............. 524/502; 523/333; 523/212; 523/213; 152/209.1; 524/862; 524/492; 524/493; 524/262

(58) Field of Classification Search ............ 524/502; 523/333; 152/209.1
See application file for complete search history.

(56) References Cited

U.S. PATENT DOCUMENTS

| | | | | |
|---|---|---|---|---|
| 3,055,956 | A | | 9/1962 | Paulsen ................. 585/320 |
| 3,317,458 | A | | 5/1967 | Clas ..................... 523/334 |
| 3,431,249 | A | * | 3/1969 | Bohrer et al. .......... 528/498 |
| 3,476,792 | A | * | 11/1969 | Malone et al. ......... 570/214 |
| 3,646,183 | A | | 2/1972 | Topcik .................. 264/117 |
| 3,686,113 | A | | 8/1972 | Burke ................... 523/210 |
| 3,767,605 | A | | 10/1973 | Gerlicher .............. 523/334 |
| 3,768,537 | A | | 10/1973 | Hess et al. ........... 152/209.5 |
| 3,907,734 | A | * | 9/1975 | Ten Broeck et al. .... 523/343 |
| 4,481,329 | A | | 11/1984 | Ambler et al. ......... 524/501 |
| 4,482,657 | A | | 11/1984 | Fischer et al. ......... 523/334 |
| 5,227,425 | A | | 7/1993 | Rauline ................. 524/493 |
| 5,405,897 | A | | 4/1995 | Segatta et al. ......... 524/290 |
| 5,763,388 | A | * | 6/1998 | Lightsey et al. ....... 523/212 |
| 5,908,660 | A | * | 6/1999 | Griffith et al. ........ 427/220 |
| 5,985,953 | A | | 11/1999 | Lightsey et al. ....... 523/212 |
| 6,025,415 | A | | 2/2000 | Scholl .................. 523/213 |
| 6,306,949 | B1 | | 10/2001 | Materne et al. ........ 524/495 |
| 6,323,260 | B1 | | 11/2001 | Koski ................... 523/213 |
| 6,344,518 | B1 | * | 2/2002 | Kobayashi et al. ..... 524/862 |
| 6,407,153 | B1 | | 6/2002 | Von Hellens .......... 524/188 |
| 6,420,456 | B1 | | 7/2002 | Koski ................... 523/213 |
| 6,433,064 | B1 | | 8/2002 | Gorl et al. ............. 524/492 |
| 6,433,065 | B1 | | 8/2002 | Lin et al. .............. 524/492 |
| 6,465,670 | B2 | | 10/2002 | Thise et al. ........... 556/400 |
| 6,537,612 | B1 | | 3/2003 | Koski ................... 427/221 |
| 6,608,145 | B1 | | 8/2003 | Lin et al. ............ 525/332.6 |
| 2005/0022915 | A1 | * | 2/2005 | Bowen et al. ........ 152/209.1 |

FOREIGN PATENT DOCUMENTS

DE        1188797        7/1962

* cited by examiner

*Primary Examiner*—Duane Smith
*Assistant Examiner*—Ives Wu
(74) *Attorney, Agent, or Firm*—Alvin T. Rockhill (57) ABSTRACT

This invention discloses a method for preparing rubber compositions that exhibit unique combinations of properties that are desirable for tire tread applications for enhanced snow/ice and wet traction, low rolling resistance and increased treadwear performance in comparison with conventional silica compounds. Specifically, a high reactively silane coupling agent, such as a mercaptosilane, is used in combination with a silane coupling typically used for silica tread compounds such as bis(triethoxysilylpropyl)disulfide to treat silica pellets in a hydrocarbon solvent at elevated temperatures. The treated silica is then blended with solution elastomer cement in a hydrocarbon solvent. The deposited reactive silanes partially react with the elastomer molecules forming a layer of polymer grafted on the silica surfaced. This structure significantly improves the silica retention during the steam stripping operation. Almost 100% (99+%) silica retention has been achieved by this invention. After solvent removal from steam stripping, the treated silica/elastomer mixer is dewatered and dried using conventional equipment such as shaker screens, expellers and expanders to form a well-dispersed silica masterbatch. This technique results in silica compounds with excellent silica dispersion and increased filler-polymer interaction, hence enhanced compound performance such as better physical properties, more desirable dynamic properties (low hysteresis at high temperatures and high hysteresis at low temperatures) and increased abrasion resistance.

21 Claims, 3 Drawing Sheets

SILICA CONTAINING RUBBER COMPOSITION

BACKGROUND OF THE INVENTION

In recent years, a considerable interest in silica reinforced rubber articles, such as tires, has developed. For instance, U.S. Pat. No. 5,227,425 indicates that tires made with tread formulations that contain silica exhibit a number of important performance advantages over tires manufactured using carbon black as the filler. The utilization of silica in tire tread formulations is believed to (a) lower rolling resistance, (b) provide better traction on snow, and (c) lower noise generation, when compared with conventional tires filled with carbon black.

U.S. Pat. No. 5,227,425 discloses a sulfur-vulcanizable rubber composition obtained by thermomechanical work of a conjugated diene compound and an aromatic vinyl compound prepared by solution polymerization in a hydrocarbon solvent having a total content of aromatic vinyl compound of between 5% and 50% and a glass transition temperature (Tg) of between 0° and −80° C. with 30 to 150 parts by weight per 100 parts by weight of elastomer of a silica having a BET surface area of between 100 and 250 $m^2/g$, a CTAB surface area of between 100 and 250 $m^2/g$, an oil absorption measured in DBP of between 150 and 250ml/100 g, and an average projected area of the aggregates greater than 8500 $nm^2$ before use and between 7000 and 8400 $nm^2$ after thermomechanical mixing as well as the additives conventionally employed, with the exception of the sulfur vulcanization system, comprising at least one heat step reaching a temperature of between 130° C. and 180° C. for a suitable period of time of between 10 seconds and 20 minutes which is a function of the temperature selected in order to carry out the mechanical work and of the nature and volume of the components subjected to the mechanical work, followed by a finishing step consisting of the incorporating of the vulcanization system by mechanical work at a temperature below the vulcanization temperature.

Sometimes rubber for tires is supplied by a rubber producer to a tire manufacturer in the form of a masterbatch containing an elastomer, an oil extender, and a filler. The traditional filler has been carbon black in the form of fine particles. These particles have hydrophobic surface characteristics and will therefore disperse easily within the hydrophobic elastomer. In contrast, silica has a very hydrophilic surface and considerable difficulty has been encountered in dispersing silica in the hydrophobic rubbery elastomer.

A number of techniques have been developed to incorporate such reinforcing agents and fillers into the polymer compositions, including both wet and dry blending processes. The incorporation of silica and carbon black as reinforcing agents and/or fillers into rubbery elastomers is far more complex than one might initially believe. One problem in wet blending of silica with latices of such polymers arises from the fact that the hydrophilic silica has a tendency to associate with the aqueous phase and not blend uniformly with the hydrophobic polymer.

To overcome the problems associated with the hydrophilic nature of the silica, U.S. Pat. No. 3,317,458 proposed a process whereby an aqueous solution of silicic acid was treated so as to precipitate silica directly onto the surface of an aqueous carbon black in paste form. One significant limitation of this technique is that the surface of the carbon black is altered thus obviating the utility of the many surface structure characteristics of specialty carbon blacks available to the skilled compounder in designing filled, reinforced polymers for specific end uses.

Attempts have been made to use cationic emulsifiers in an effort to distribute such fillers and/or reinforcing agents in polymeric lattices; notably among them are quaternary alkylated ammonium halides (see German Patent No. 1,188, 797). It has been found, however, that such quaternary ammonium compounds have a tendency to react with the carbon black, dispersing it into the aqueous phase; that limiting the ability to blend carbon black with the polymeric components in the latex. In U.S. Pat. No. 3,686,113 aqueously wet silica is treated with oleophilic quaternary ammonium compounds to blend with an aqueous dispersion of an elastomer containing an anionic dispersing agent. In addition to the problem referenced above with carbon black dispersion, unfortunately, such techniques require specific coagulating agents.

Perhaps the most commonly employed practice, used commercially, is the technique of dry blending either silica, carbon black or both of them into rubber and thermoplastic polymers in a high-shear milling operation. That practice has many limitations. Notable among them include the tendency of the filler particles to agglomerate to each other, resulting in nonuniform dispersion of the filler throughout the polymer constituting the continuous phase. Another problem commonly experienced in such high-shear milling operations is the tendency of the polymers to degrade during milling. That necessitates the use of higher molecular weight polymers, which sometimes require the incorporation of various types of processing aids to facilitate mixing and dispersion of the filler particles into the polymer constituting the continuous phase. The cost associated with the use of such processing aids also increases the manufacturing cost of the polymeric compound or article and can lead to diminished product performance. The use of processing aids has the further disadvantage in that such processing aids may have a negative effect on the cure or end use of the polymer. Such dry blending techniques also result in additional processing costs, in part due to excessive equipment wear caused by the abrasive fillers.

To improve dispersion of the silica during dry mixing, it has been proposed that such compounding operations employ a silica which has been treated with an organosilane coupling agent having dual functionality. Representative of such coupling agents are those well known compounds that include both an organic group, such as an amino alkyl group, a mercaptoalkyl group, or a polysulfidic-bis-organo alkoxy silane group bonded directly to the silicon atom along with a readily hydrolyzable group, such as an alkoxy group as represented by a methoxy group or an ethoxy group, likewise bonded directly to the silicon atom. In those systems, it is generally recognized that the alkoxy group hydrolyzes in the presence of moisture typically found on the surface of the silica to form the corresponding silanol which reacts with or condenses in the presence of the silica surface to bond the silicon atom to the silica surface. The organic groups likewise attached to the silicon atom are thus available for chemical reaction with the polymer matrix during vulcanization. As a result, the polymer matrix may become chemically bonded by means of the coupling agent to the silica surface during cure or vulcanization of the polymer. Problems associated with the use of such silanes during compounding are unpleasant odors, premature curing, and/ or scorching.

In an effort to overcome the problems associated with the use of silane coupling agents, it has been proposed in U.S. Pat. No. 5,405,897 to employ phenoxy acidic acid along with a methylene donor in place of the conventional organosilanes. The foregoing patent suggests that the use of such a system provides improved physical properties and reduced viscosity of the melt during compounding.

Various other attempts have been made to overcome the problems associated with wet blending such fillers and/or reinforcing agents with polymer latices. For example, it has been proposed, as described in U.S. Pat. No. 3,055,956 and U.S. Pat. No. 3,767,605 to add carbon black in the form of a slurry directly to an emulsion polymerization process of rubbery polymer, at the latex stage, followed by coagulation and recovery of a rubber-carbon black masterbatch. Such processes work well with carbon black, but fail to incorporate substantial amounts of fine particulate silica. U.S. Pat. No. 4,481,329 proposes a process for dispersing carbon black and like fillers into concentrated rubber latices by the use of a low molecular weight conjugated diene/carboxylic acid polymer in the form of an alkali metal salt dissolved in water as the dispersing aid or dispersing latex.

U.S. Pat. No. 4,482,657 describes mixtures of silica and synthetic polymers prepared by treating a polymer latex with a dispersion of silica and an alkyl trimethyl ammonium halide in water. The presence of a quaternary ammonium halide in this process necessitates the slow addition of the silica dispersion to prevent premature coagulation. Other elaborate techniques as described in U.S. Pat. No. 3,907,734 where a partitioning agent in the form of a blend of precipitated silica and hydrophobic fumed silica are incorporated into a concentrated polymer latex have been suggested. The fumed silica adsorbs the water, and the resulting solid mixture is dried with removal of the hydrophobic fumed silica to form a free flowing blend of polymer particles coated with precipitated silica. That process is limited to relatively small scale batch system and requires recovery and recycle of the hydrophobic fumed silica. That process fails to incorporate into the polymer the more desirable hydrophobic fumed silica.

Such processes with concentrated latex, as those skilled in the art can readily appreciate, involve complex procedures not only blending the silica with the polymer latex, but also in effecting its recovery when excess silica or carbon black must be employed. Another limitation of such processes is that recovery of the filled polymer directly from the latex stage without filtration and like treatment steps used to remove byproducts from the emulsion polymerization can have deleterious effects on the end use properties of the polymer thus recovered. Such problems can be seen in French Patent 2,558,008 and French Patent 2,558,874. In the first, the addition to a rubber latex of precipitated silica effects coagulation of the rubber polymer. In the second, a stable latex of derivatized silica and a carboxylated butadiene rubber is prepared to add to natural or synthetic elastomer latices. The derivatization of the silica is accomplished by treatment with polyamines, polyethylene amines or nonionic polyoxyethylene. Such free agents are wholly incompatible with typical coagulation techniques used in the recovery of the emulsion process polymers.

It is well known that mercaptosilanes offer excellent coupling between rubber and silica, resulting in rubber compounds for tire treads with improved wet and ice skid resistance, rolling resistance and treadwear even at low loadings. For instance, U.S. Pat. No. 3,768,537 demonstrates the excellent compound properties that can be attained by the use of mercaptosilanes in silica loaded rubber compounds. However, as revealed by U.S. Pat. No. 6,433,065, the high reactivity of mercaptosilanes makes it impractical to use such silane coupling agents in applications where conventional Banbury mixing is employed. In cases where mercaptosilane coupling agents are used in silica compounds it is important to maintain a low temperatures (120° C. to 145° C.) to avoid premature crosslinking which proves to be a problem at higher temperatures. However, low mixing temperatures result in a marked reduction in the mechanical efficiency of mixing that is essential for an optimum dispersion of the silica. The longer mixing time at a low temperature results in a significant reduction in mixing productivity which in turn increases expense. Another drawback of using low temperatures for mixing without extended mixing duration is that less completed silanization occurs which results in the release of ethanol in downstream operations giving rise to porosity from the extrudate and reduced extrusion rates.

Using a combination of two silane coupling agents in silica compounds has been suggested in the patent literature. U.S. Pat. No. 6,306,949 discloses the use of a combination of an organosilane disulfide and an organosilane tetrasulfide for silica compounds for enhanced processibility and improved compound properties. In such a process, the organosilane disulfide coupling agent is introduced during the non-productive stage of the mixing so that higher mixing temperatures can be used to mix the silica compounds to ensure a better dispersion of silica throughout the rubber compound. The organosilane tetrasulfide is introduced during the productive stage where the mixing temperature is low (100° C. to 120° C.) so that scorch of the compounds from premature crosslinking can be avoided. However, the very low temperature and short duration during the final pass of the mixing will not ensure sufficient silanization of the organosilane tertrasulfide in the silica compounds during compounding. Since the rate of silanization for tertrasulfide-type silane coupling agents is very low at a temperature lower than 120° C., ethanol is accordingly released during downstream operations, such as extrusions and curing.

U.S. Pat. No. 6,433,065 teaches the use of a small amount of a mercaptosilane coupling agent in combination with an allyl alkoxysilane for silica or silica/carbon black compounds in Banbury mixing. It is claimed that very high temperature mixing (170° C. to 185° C.) can be conducted without causing premature crosslinking of the compounds. U.S. Pat. No. 6,608,145 discloses the use of a small quantity of a organosilane tetrasulfide, bis(triethoxylsilylpropyl)tetrasulfide (TESPT) in combination with an allyl alkoxysilane. It is again claimed that very high temperatures (165° C. to 200° C.) could be used to mix silica or silica/carbon black compounds by Banbury mixing without causing premature crosslinking of the compounds. However, having a non-coupling silane (allyl alkoxysilane) in the silica compounds is not expected to enhance the interaction between silica and the polymeric chain, hence the performance of the silica compounds. U.S. Pat. No. 6,433,065 and U.S. Pat. No. 6,608,145 do not teach the use of mercaptosilane, singly or in combination with allyl alkoxysilane, for the preparation of silica masterbatches in a solvent system.

Different approaches are disclosed in the patent literature for the preparation of silica masterbatches. U.S. Pat. No. 5,985,953 reveals the preparation of emulsion styrene-butadiene rubber (e-SBR) based silica masterbatches. U.S. Pat. No. 6,433,064 discloses a rubber composition based on emulsion styrene-butadiene rubber and a two step process for making such a composition. U.S. Pat. No. 6,407,153, U.S. Pat. No. 6,420,456, and U.S. Pat. No. 6,323,260 describe processes by which silica particles are first treated with a compound containing amino and silane groups, followed by treatment with a silane compound containing a hydrophobic group. Similarly, U.S. Pat. No. 6,537,612 discloses a process through which the silica particles are treated with different chemical species to render the silica surface hydrophobic. The treated silica is then mixed with solution styrene-butadiene rubber or polybutadiene rubber cement to make elastomer masterbatches. However, an aqueous silica slurry is the starting material for the preparation of the silica masterbatch in all those approaches. Either the silica slurry is prepared by mixing water with silica or an aqueous silica slurry from the precipitated silica production process which is used directly in making silica masterbatches. Silica slurries are used in those approaches on the basis of the conventional thinking that because of the hydrophilic nature of silica, water would be the ideal medium for the treatment of the silica in the preparation of silica masterbatches.

It is well known to those skilled in the art that it is difficult for the silane coupling agents to react directly with silica in an aqueous medium. Hence, transfer agents are disclosed in U.S. Pat. No. 6,465,670 and French Patent 2,804,119 to increase the chance for the silane coupling agent to react with the silica surface. U.S. Pat. No. 6,407,153 and U.S. Pat. No. 6,420,456 disclose the use of amino silane with alkyl terminations before introducing silane coupling agents. In addition to being a more complex process, the introduction of other chemical species prior to silane coupling agents render some of the reactive sites on the silica surface unavailable for the silanization process.

U.S. Pat. No. 6,025,415 discloses a process through which silica powder could be rendered water-repellent and the dried water-repellent silica could be incorporated into solution elastomer cements in an organic solvent.

The size of the rubber crumb and the absence of fines in the rubber/water mixer from steam stripping operations are important parameters for successful down stream operations, such as dewatering using a shaker screen and an expeller and drying using an expander. U.S. Pat. No. 6,323,260 reveals that the speed of the agitation during the steam stripping operation needs to be reduced to ensure a relative large size of the crumb. However, reducing the speed of the agitation during the steam stripping operation also significantly reduce the efficiency of the steam stripping operation to remove organic solvents.

SUMMARY OF THE INVENTION

This invention discloses rubber compositions and a process for making the rubber compositions that exhibit unique combinations of properties desirable for tire tread applications for enhanced snow/ice traction, low rolling resistance, improved wet traction and increased treadwear performance in comparison with conventional silica compounds. The enhancement in performance is achieved through (a) novel use of interfacial chemistry between silica and elastomer in the rubber compounds; (b) processes involving the use of hydrocarbon solvent and of silica pellets for hydrophobation of silica; and (c) use of dewatering and drying equipment to break up the treated silica pellets to achieve excellent dispersion of the silica in the elastomer matrix. Specifically, a highly reactive silane coupling agent, such as mercaptosilane, is used in combination with a silane coupling agent conventionally used for silica tread compounds, such as bis(triethoxylsilylpropyl)disulfide (TESPD), to treat silica pellets in a hydrocarbon solvent through hydrophobation. The treated silica is blended with solution elastomer cement in a hydrocarbon solvent. The deposited reactive silanes partially react with the elastomer molecules forming a layer of polymer grafted on the silica surface. This structure significantly improves the silica retention during the steam stripping operation. Almost 100% (99+%) silica retention has been achieved by this invention. The solvent is then removed from the treated silica/elastomer mixer using conventional steam stripping. The silica/elastomer crumbs formed from the stream stripping is dewatered and dried using conventional equipment such as shaker screens, expellers and expanders. The treated silica pellets can be easily broken up during expeller and expander operation to form a well-dispersed silica masterbatch. This technique gives rise to silica compounds with increased filler-polymer interaction, resulting in enhanced compound performance, such as better physical properties, more desirable dynamic properties (low hysteresis at high temperatures and high hysteresis at low temperatures and increased abrasion resistance.

In comparison with conventional silica compounds containing a single silane coupling agent, in one embodiment of this invention two different silica coupling agents are utilized which results in enhanced tensile properties (300% Modulus and 300% over 100% modulus ratio), improved dynamic properties (lower tan $\delta$ at 70° C., higher tan $\delta$ at 0° C., reduced E' at −20° C.) and increased abrasion resistance (DIN abrasion). It is expected that, based on the correlation known to the tire industry between the compound properties and tire performance, the silica masterbatch compound from this invention will exhibit reduced rolling resistance, enhanced wet traction and improved ice and snow traction. It has been found that the introduction of a small quantity of a mercaptosilane into a silica masterbatch results in a significant enhancement of the compound performance without negatively affecting the processing characteristics of the compound.

This invention is based on the surprising discovery that using a hydrocarbon solvent as the medium for the treatment of silica results in the production of a silica masterbatch having very good compound properties. Though contributions to the performance of the silica masterbatch would be multiple, it is postulated that the low polarity of the conventional hydrocarbon solvents would drive the polar silane coupling agent toward the silica surface, hence increasing the efficiency of the silane coupling agent. In contrast, the driving force for the silane coupling agent to move to the surface of the silica would be lower in an aqueous system.

The subject invention is also based on the unexpected discovery that using a combination of a small quantity of a mercaptosilane and silica pellets, instead of silica powder, results in a significantly increased crumb size and a virtual elimination of fines in the silica masterbatch/water mixer recovered from steam stripping operations without reducing agitation speeds. It was further surprisingly found that the treated silica pellets can be easily broken down with an excellent dispersion of the silica being attained by using conventional dewatering and drying devices, such as expellers and expanders.

One novel feature of the present invention is therefore the use of a highly reactive mercaptosilane and a silane coupling agent conventionally used for tire compounds. Such a combination results in a silica compound with excellent compound performance without processing issues such as pre-crosslinking and scorching of the compound.

In another embodiment of the present invention, silica is treated using a combination of two silane coupling agents in a hydrocarbon solvent. The use of a hydrocarbon solvent for the silica treatment makes it easy to mix the treated silica with hydrocarbon-based elastomer cement, hence further enhancing the dispersion of silica in the elastomer matrix and reducing the complexity of the manufacturing process.

In another embodiment of the present invention, highly dispersible (HD) silica pellets, rather than silica powder are used in the preparation of the silica masterbatch. The usage of silica pellets results in a tremendous increase in the crumb sizes and a virtual elimination of fines in the silica masterbatch/water mixer from the steam stripping operation, making it feasible to use conventional dewatering and drying devices such as shaker screens, expellers and expanders.

The method for preparing silica masterbatches in accordance with this invention involves mixing 100% silica pellets with an organic solvent such as hexane in a reactor. Alternatively, a blend silica pellets and silica powder can be used for making the silica/organic solvent slurry. The blending range of silica pellets in the blend is from 100% to 10%. Higher levels of silica pellets result in increased crumb sizes and reduced level of fines. The silica/organic slurry is heated to temperatures preferably in the range between 60° C. and 130° C. and more preferably in the range between 60° C. and 100° C.

Next, mercaptosilane/organosilane disulfide or tertrasulfide is introduced into the silica/organic solvent slurry. The percentage of the mercaptosilane in the blend is preferably between 1 to 20% and more preferably between 5 to 15%. The temperature of the reactor is maintained between 60° C. and 130° C. and more preferably in the range between 60° C. and 100° C., during the silanization process. Other than thermal energy, catalysts, such as acids, could be introduced into the reactor to accelerate the silanization process.

The treated silica in an organic solvent is then blended with elastomer cement in an organic solvent. The elastomer cement could be from solution styrene butadiene rubber (SBR), butadiene rubber (BR) or other elastomers. Preferably, the temperature of the reactor is maintained when the treated silica is blended with the elastomer cement. Optionally, the elastomer cement is heated to a desired temperature prior to being blended with the treated silica.

The silica/elastomer cement mixture can then be pumped into a steam stripping tank to remove the organic solvent. In the alternative, the silica/rubber blend can be recovered from the organic solvent by coagulation or utilizing a spray-drying technique.

The crumb from the steam stripping operation can then be dewatered and dried using a shaker screen and Rocket or an expeller and expander. Optionally, the masterbatch from the Rocket or expeller/expander can be further dried by other means.

The present invention more specifically discloses a process for preparing a silica/rubber blend which comprises dispersing a slurry of silica throughout a cement of a rubbery polymer, wherein the slurry of silica is made by dispersing the silica and a silica coupling agent throughout an organic solvent, and subsequently recovering the silica/rubber blend from the organic solvent.

The present invention further discloses a process for preparing a silica/rubber blend which comprises (1) dispersing silica and a silica coupling agent throughout an organic solvent to make a slurry of silica, (2) dispersing the slurry of silica throughout a cement of a rubbery polymer, and (3) recovering the silica/rubber blend from the cement.

DETAILED DESCRIPTION OF THE INVENTION

The technique of this invention can be used to incorporate silica into virtually any type of rubbery polymer (elastomer). For instance, the rubbery polymer can be natural rubber, synthetic polyisoprene rubber, polybutadiene rubber, isoprene-butadiene rubber (IBR), styrene butadiene rubber (SBR), styrene-isoprene rubber (SIR), styrene-isoprene-butadiene rubber (SIBR), or some other type of conventional polydiene rubber.

In practicing the present invention, a silica slurry is made by dispersing silica and a silica coupling agent throughout an organic solvent. This results in the formation of a slurry of treated silica in the organic solvent. The slurry of treated silica is then dispersed throughout the cement of the rubbery polymer. After the treated silica has been well dispersed throughout the cement of the conventional rubber, the silica/rubber blend is recovered from the organic solvent employed in making the cement. Normally, agitation will be provided to mix the various components together to attain an essentially homogeneous solution.

The conventional rubbery polymer used in the blend will typically be a synthetic rubber made by solution polymerization in the organic solvent. In such cases, the cement of the rubbery polymer will be used in the process of this invention without previously being recovering from the organic solvent in which it was synthesized. On the other hand, if the conventional rubber is natural rubber or a synthetic rubber made by emulsion polymerization then it will be necessary to dissolve the rubbery polymer in an organic solvent to make a cement of it in the organic solvent.

The organic solvent will typically be a liquid hydrocarbon that can be one or more aromatic, paraffinic or cycloparaffinic compounds. These solvents will normally contain from 4 to 10 carbon atoms per molecule and will be liquid at room temperature. Some representative examples of suitable organic solvents include pentane, isooctane, cyclohexane, methylcyclohexane, isohexane, n-heptane, n-octane, n-hexane, benzene, toluene, xylene, ethylbenzene, diethylbenzene, isobutylbenzene, petroleum ether, kerosene, petroleum spirits, petroleum naphtha and the like, alone or in admixture. Cyclohexane and mixtures of various hexane isomers are typically preferred for utilization as the organic solvent. The organic solvent used in making the slurry of treated silica will typically be the same solvent as is employed in the cement of the conventional rubbery polymer. However, the organic solvent used in making the treated silica slurry can be a different organic solvent which is compatible with the solvent utilized in making the rubber cement.

The cement of the rubbery polymer will normally contain from about 5 weight percent to about 30 weight percent polymer and from about 70 weight percent to about 95 weight percent of the organic solvent. In most cases, it will be preferred for the rubber cement to contain from 10 weight percent to 25 weight percent of the rubbery polymer. It is generally more preferred for the rubber cement to contain 15 weight percent to 20 weight percent of the elastomer.

The silica utilized can include pyrogenic and precipitated siliceous pigments, although precipitate silicas are preferred. The siliceous pigments preferably employed in this invention are precipitated silicas such as, for example, those obtained by the acidification of a soluble silicate, e.g., sodium silicate. As a general rule, the silica will have an average particle size that is within the range of about 4 nm to 120 nm, and will preferably have a particle size that is within the range of 7 nm to 60 nm Such silicas might be characterized, for example, by having a BET surface area, as measured using nitrogen gas, preferably in the range of about 40 to about 600, and more usually in a range of about 50 to about 300 square meters per gram. The silica will preferably have a BET surface area that is within the range of about 125 $m^2/g$ to about 200 $m^2/g$. The BET method of measuring surface area is described in the *Journal of the American Chemical Society*, Volume 60, page 304 (1930).

The silica may also be typically characterized by having a dibutylphthalate (DBP) absorption value in a range of about 100 to about 400 ml/100 g, and more usually about 150 to about 300 ml/100 g. The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in the practice of this invention. Some representative examples of silica that can be used in the practice of this invention includes, but is not limited to, silicas commercially available from PPG Industries under the Hi-Sil trademark, such as Hi-Sil® 210 and Hi-Sil® 243, silicas available from Rhone-Poulenc, with, for example, designations of Z1165MP and Z165GR and silicas available from Degussa AG with, for example, designations VN2, VN3, and BV9000GR. Zeopol® 8745 silica from J. M. Huber Corporation, reportedly having an average total of about 13 hydroxyl groups per square nanometer of silica surface area and a ratio of geminal hydroxyl groups to said average total of about 0.23/1; a CTAB value of about 145$m^2$/g and a BET value of about 185 $m^2$/g can also be used in the practice of this invention. Zeopol® 8715 silica from J. M Huber Corporation reportedly characterized by having an average total of about 18 hydroxyl groups per square nanometer surface of said silica and a ratio of geminal hydroxyl groups to said average total of about 0.27/1, a CTAB value of about 94 $m^2$/g and a BET value of about 163 $m^2$/g is another example of a silica that can be used in the practice of this invention.

The silica coupling agent will typically be a compound of the formula:

Z-Alk-S$_n$-Alk-Z (I)

Z-Alk-Sn-Alk (II)

Z-Alk-SH (III)

Z-Alk (IV)

Si(OR$^1$)$_4$ (V)

in which Z is selected from the group consisting of where R$^1$ is an alkyl group of 1 to 4 carbon atoms, cyclohexyl or phenyl; wherein R$^2$ is alkoxy of 1 to 8 carbon atoms or cycloalkoxy of 5 to 8 carbon atoms; and wherein Alk is a divalent hydrocarbon of 1 to 18 carbon atoms and n is an integer of 2 to 8. It should be noted that such compounds can be used alone or in combination.

Specific examples of sulfur-containing organosilicon compounds which may be used in accordance with the present invention include: 3,3'-bis(trimethoxysilylpropyl) disulfide, 3,3'-bis(triethoxysilylpropyl)tetrasulfide, 3,3'-bis(triethoxysilylpropyl) octasulfide, 3,3'-bis(trimethoxysilylpropyl)tetrasulfide, 2,2'-bis(triethoxysilylethyl) tetrasulfide, 3,3'-bis(trimethoxysilylpropyl)trisulfide, 3,3'-bis(triethoxysilyipropyl) trisulfide, 3,3'-bis(tributoxysilylpropyl)disulfide, 3,3'-bis(trimethoxysilylpropyl) hexasulfide, 3,3'-bis(trimethoxysilylpropyl)octasulfide, 3,3'-bis(trioctoxysilylpropyl) tetrasulfide, 3,3'-bis(trihexoxysilylpropyl)disulfide, 3,3'-bis(tri-2"-ethylhexoxysilylpropyl)trisulfide, 3,3'-bis(triisooctoxysilylpropyl)tetrasulfide, 3,3'-bis(tri-t-butoxysilylpropyl)disulfide, 2,2'-bis(methoxy diethoxy silyl ethyl)tetrasulfide, 2,2'-bis(tripropoxysilylethyl)pentasulfide, 3,3'-bis(tricyclonexoxysilylpropyl) tetrasulfide, 3,3'-bis(tricyclopentoxysilylpropyl)trisulfide, 2,2'-bis(tri-2"-methylcyclohexoxysilylethyl)tetrasulfide, bis(trimethoxysilylmethyl) tetrasulfide, 3-methoxyethoxy propoxysilyl 3'-diethoxybutoxy-silylpropyltetrasulfide, 2,2'-bis(dimethylmethoxysilylethyl)disulfide, 2,2'-bis(dimethylsec.butoxysilylethyl) trisulfide, 3,3'-bis(methylbutylethoxysilylpropyl) tetrasulfide, 3,3'-bis(di t-butylmethoxysilylpropyl) tetrasulfide, 2,2'-bis(phenylmethyl methoxysilylethyl) trisulfide, 3,3'-bis(diphenyl isopropoxysilylpropyl)tetrasulfide, 3,3'-bis(diphenyl cyclohexoxysilylpropyl)disulfide, 3,3'-bis(dimethyl ethylmercaptosilylpropyl) tetrasulfide, 2,2'-bis(methyl dimethoxysilylethyl)trisulfide, 2,2'-bis(methyl ethoxypropoxysilylethyl)tetrasulfide, 3,3'-bis(diethyl methoxysilylpropyl)tetrasulfide, 3,3'-bis(ethyl di-sec.butoxysilylpropyl)disulfide, 3,3'-bis(propyldiethoxysilylpropyl) disulfide, 3,3'-bis(butyldimethoxysilylpropyl)trisulfide, 3,3'-bis(phenyldimethoxysilylpropyl)tetrasulfide, 3-phenylethoxybutoxysilyl 3'-trimethoxysilylpropyl tetrasulfide, 4,4'-bis(trimethoxysilylbutyl)tetrasulfide, 6,6'-bis(triethoxysilylhexyl)tetrasulfide, 12,12'-bis(triisopropoxysilyl dodecyl)disulfide, 18,18'-bis(trimethoxysilyloctadecyl)tetrasulfide, 18,18'-bis(tripropoxysilyloctadecenyl) tetrasulfide, 4,4'-bis(trimethoxysilyl-buten-2-yl)tetrasulfide, 4,4'-bis(trimethoxysilylcyclohexylene)tetrasulfide, 5,5'-bis(dimethoxymethylsilylpentyl) trisulfide, 3,3'-bis(trimethoxysilyl-2-methylpropyl)tetrasulfide and 3,3'-bis(dimethoxyphenylsilyl-2-methylpropyl)disulfide.

The preferred sulfur-containing organosilicon compounds are the 3,3'-bis(trimethoxy or triethoxy silylpropyl)sulfides. The most preferred compounds are 3,3'-bis(triethoxysilylpropyl)tetrasulfide and 3,3'-bis(triethoxysilylpropyl)disulfide. Therefore, as to Formula I, preferably Z is where $R^2$ is an alkoxy of 2 to 4 carbon atoms, with 2 carbon atoms being particularly preferred; Alk is a divalent hydrocarbon of 2 to 4 carbon atoms with 3 carbon atoms being particularly preferred; and n is an integer of from 3 to 5 with 4 being particularly preferred.

Various commercially available silane coupling agents may be considered for use in the practice of this invention. Some representative examples of silane coupling agents that can be used in the practice of this invention include, but are not limited to, compounds of formula (I), such as, Si69® and Si266 from Degussa AG, SILQUEST® A1289 and A1589 from GE Silicones; formula (II), such as, NXT silane from GE Silicones and formula (III), such as, SILQUEST® A189 and A1891 from GE Silicones, VP Si163 and VP Si263 from Degussa AG.

The amount of silica incorporated into the rubber will vary with the application in which the polymer is being used. However, the silica will typically be incorporated at a level within the range of about 40 phr to about 200 phr (parts by weight per 100 parts by weight of the rubber). In most cases the silica will be incorporated into the rubbery polymer at a level which is within the range of about 50 phr to about 150 phr.

The silica coupling agent will typically be mixed with the silica employed in making the treated silica slurry at a level which is within the range of about 2 phr to about 20 phr, based upon the amount of rubber into which the treated silica slurry will be mixed. The silica coupling agent will more typically be added to the slurry at a level which is within the range of about 3 phr to about 15 phr. The silica coupling agent will preferably be added to the slurry at a level which is within the range of about 4 phr to about 8 phr.

An extending oil can also optionally be added to the cement of the rubbery polymer. Such extending oils will typically be added at a level which is within the range of 0 phr to 50 phr. In the case of oil extended rubbers the oil will more typically be added in an amount which is within the range of 10 phr to 45 phr, and will most typically be added at a level which is within the range of 20 phr to 35 phr.

The treated silica slurry will typically be dispersed into the cement of the conventional rubber at a temperature which is within the range of about 25° C. to about 170° C. These components will more typically be dispersed into the rubber cement at a temperature which is within the range of 40° C. to about 150° C., and will preferably be dispersed into the polymer cement at a temperature which is within the range of 50° C. to 130° C. It is normally advantageous in commercial applications for this to be done at a temperature which is within the range of about 60° C. to about 100° C.

After the treated silica slurry has been dispersed throughout the cement of the rubbery polymer the silica/rubber blend is recovered from the organic solvent. This can be accomplished by using a variety of techniques. One such procedure comprises mixing the rubber cement with a polar coagulating agent, such as methanol, ethanol, isopropylalcohol, acetone, or the like. The coagulating agent can be added at room temperature or below whereupon the liquified low molecular weight hydrocarbons will vaporize. If desired, gentle heat may be applied to hasten the removal of low molecular weight hydrocarbons, but not sufficient heat to vaporize the polar coagulating agent. The vaporized low molecular weight hydrocarbon solvents can then be recovered and recycled. The coagulated silica/rubber blend is recovered from the slurry of the polar coagulating agent by centrifugation, decantation, or filtration.

Another procedure for recovering the silica/rubber blend is by subjecting the rubber cement (solution) to spray-drying. Such a procedure is particularly suitable for continuous operations and has the advantage that heat requirements are minimized. When such a procedure is used, the recovered polymer should be washed soon after recovery with a polar solvent in order to destroy the remaining active catalyst contained in the polymer. In such procedures, the vaporized organic solvents are also easily recovered but will normally require purification before being recycled.

In commercial operations, steam stripping techniques will typically be employed to recover the silica/rubber from the polymer cement. In such steam stripping procedures solvent and residual monomer will typically be recycled. After steam stripping, the silica masterbatch crumb will normally be dried in an extruder-drier at an elevated temperature.

The silica/rubber blend will typically be used as a masterbatch and accordingly will subsequently be blended with additional polymers and rubber chemicals. This can be accomplished by using an expander/expeller, a twin-screw extruder, a continuous mixer, or the like.

It was found that HD silica pellets, or a combination of HD silica pellets and silica powder, can be mixed well with an organic solvent into a consistent silica slurry under normal agitation. With HD silica pellets the viscosity of the silica slurry remains low even when a very high loading level of silica (25 wt %) is introduced into the organic solvent. The viscosity is further reduced when silane coupling agents are introduced and silanization conducted. The low viscosity of the silica slurry facilitates the process for the manufacture of the silica masterbatch.

The use of HD silica pellets, such as Rhodia's Z1165MP highly dispersible silica pellets, or a combination of silica pellets with silica powder, rather than silica powder alone, is preferred for the preparation of silica masterbatches. The use of HD silica pellets or a combination of the HD silica pellets and silica powder results in a much increased crumb size and elimination of fines. Surprisingly, in combination with an extrusion drying device, such as Rocket and expellers/expanders, the treated silica pellets can easily broken down and dispersed well into the elastomer matrix, resulting in very good compound properties. HD silica pellets can be described as a three-dimensional skeleton type of structure with huge empty spaces (relative to the size of a typical silane coupling agent). The highly porous nature of the HD silica pellet is revealed from the very low density of the pellet (about 0.4 g/cc for the HD pellet in contrast to 2.0 g/cc for conventional silica), the image of the cross section of the pellet as viewed with a scanning electron microscope (SEM), and the high void content of the pellet as determined by Mercury porosity measurements.

The relatively smaller size of the mercaptosilane coupling agent molecules can be a potential advantage, especially when silica pellets are used for the preparation of the silica masterbatch. Its small size allows mercaptosilane molecules to penetrate into small pores of the silica, while relatively large sized organosilane disulfide or tertrasulfide molecules are only capable of occupying the larger pores and spaces. Therefore, the combination of a small-sized mercaptosilane coupling agent and a conventional silane coupling agent typically used in silica compounds enhances the performance of the silica masterbatch due to the combined ability to penetrate into both small and large pores in the silica pellets. It is suggested in the literature that the pore cavities of the structure of HD silica will even allow the penetration of the polymer chains, which could hasten the break-up of the silica agglomerates (see P. J. DiMauro et al, Highly Dispersible Silica in Non-Tire Formulations, Rubber World, p. 25, September 2000). This is frequently cited as the reason for improved dispersion of HD silica in silica compounds from conventional Banbury mixing. Typically, as revealed from EP Application No. 1,241,203, a pore-sized distribution of silica pellets from mercury porosity evaluation is that 5% or less of its pores have a diameter of less than 10 nm; 60 to 90% of its pores have a diameters of about 10 to about 100 nm; 10 to 30% of its pores have a diameter of about 100 to 1000 nm, and 5 to 20% of its pores have a diameter of greater than about 1000 nm.

A high loading level of a mercaptosilane in the silica masterbatch is undesirable, since the formation of too many functional polymers in the system could negatively affect the processability of the compound even through the tensile properties and dynamic performance of the compound could be further enhanced. A combination of mercaptosilanes and conventional silane coupling agents (organosilane disulfide and tetrasulfide) are therefore used to balance the need for processability and performance of the compound. It appears that a mercaptosilane loading level of less than 1% (based on the silica loading in the silica masterbatch formulation) is desirable for enhanced compound performance without any significant negative impact on the processing characteristics of the silica masterbatch compounds.

It was found that the sequence of addition of the mercaptosilane and organosilane disulfide or tetrasulfide could affect the properties of the silica masterbatch—an early introduction of the mercaptosilane into the silica slurry gives rise to a silica masterbatch with more desirable dynamic performance as shown by reduced hysteresis at high temperatures (tan δ at 70° C.). It is contemplated that adding mercaptosilane earlier gives the mercaptosilane coupling agent a better chance to react with the silica surface and hence takes advantage of the higher reactivity of the silane coupling agent. The enhanced compound dynamic performance correlates well with the observation that adding mercaptosilane earlier results in increased bound rubber content. However, adding the two silane coupling agents together, instead of adding them separately simplifies the process for the preparation of the silica masterbatch with only a minor compromise on the performance of the silica masterbatch.

EXAMPLES

This invention is illustrated by the following examples that are merely for the purpose of illustration and are not to be regarded as limiting the scope of the invention or the manner in which it can be practiced. Unless specifically indicated otherwise, parts and percentages are given by weight.

The silica masterbatch from this invention was mixed with other ingredients conventionally used for silica tread compounds in a Banbury mixer. Conventional silica pellets were mixed with other ingredients conventionally used for silica tread compounds in a Banbury mixer for the purpose of comparison. For conventional silica, the compound was mixed using a three-pass mixing procedure with the dump temperature of the two non-productive passes being 170° C. for organosilane disulfide-based silica compounds and 160° C. for organosilane tetrasulfide-based silica compounds. Alternatively, blocked silane coupling agents, such as NXT silane from GE Silicones, could be used in combination with a mercaptosilane to prepare the silica masterbatch, in which case, the dump temperature for the reference compound with the NTX silane would be 170° C. or higher. The curatives were added in the productive pass with the dump temperature being 110° C. Since silica was already well dispersed in the elastomer matrix and the silanization completed for the silica masterbatch, the non-productive pass for mixing silica masterbatch compounds was reduced to one. The dump temperature for the silica masterbatch-based compound was the same as the corresponding dry mixed silica compound. The curatives were added in the productive pass with the dump temperature being 110° C. The compounds were cured following standard rubber industrial practices for different types of testing.

Example 1

This example demonstrates the use of an organic solvent and mercaptosilane for preparing silica slurry and the introduction of mercaptosilane for enhanced compound performance. This example also illustrates the use of a combination of silica pellets and powder to create large silica masterbatch crumbs for excellent down stream operations.

In the procedure used, 520.16 g of hexane and 173.39 g of silica were charged into a 1-gallon reactor. The reactor was then heated. When the temperature of the hexane/silica slurry reaches 95° C.-100° C., silane coupling agents were introduced. After 1 hour of reaction, 1366.43 g of SLF 28X42 SBR cement in hexane (20.8% solid) was blended into the reactor while maintaining the temperature. The mixture was then steam stripped off the solvent and dewatered and dried through screens and the Rocket. Specifically, for Example 1-A, 100% of silica powder (Z1165P) and 13.73 g of Si266 were charged into the reactor. For Example 1-B, 100% of silica powder (Z 1165P) and a blend of Si266/A189 (12.48 g of Si266 and 1.25 g of A189) were used. And for Example 1-C, a blend of 50% Z 1165P and 50% Z 1165 MP and a blend of Si266 and A189 (12.48 g of Si266 and 1.25 g of A189) were used. The final composition of the silica masterbatch was as follows:

|  | 1-A | 1-B | 1-C |
|---|---|---|---|
| SLF 42X28 | 137.5 | 137.5 | 137.5 |
| Z1165 P | 83.3 | 83.3 | 41.6 |
| Z1165MP |  |  | 41.6 |
| Si266 | 6.6 | 6 | 6 |
| A189 |  | 0.6 | 0.6 |

The compound formulation is shown in Table 1. Due to the small quantity of the silica masterbatch, a 600 cc laboratory Banbury mixer was used to mix the compounds. The properties of the four compounds are listed in Table 2. As shown in Table 2, silica masterbatch-based compounds exhibited much enhanced properties in comparison with dry mixed silica compounds. Specifically, the silica masterbatch-based compounds exhibited better performance in terms of:

- Enhanced tensile properties (higher 300% modulus, higher M300/M100 ratio)
- Improved hysteretic properties (higher tan delta at lower temperature (0° C.), lower tan delta at high temperature (60° C.) and higher rebound at high temperature)
- Enhanced filler-polymer interaction (Lower Payne Effect ΔG')
- Improved abrasion resistance
- Reduced modulus at very low temperature (potentially enhanced ice/snow traction for winter tires).

Figure 1:
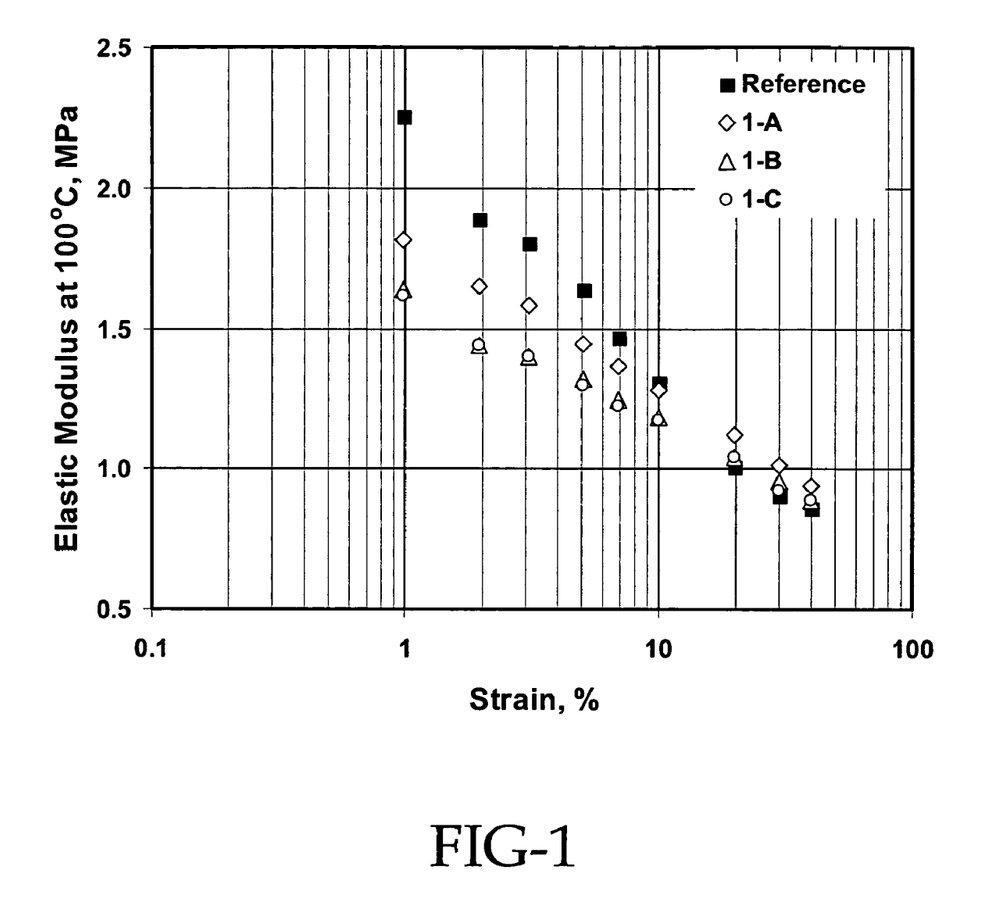
FIG. 1 shows the lower Payne effect from the introduction of a small quantity of a mercaptosilane coupling agent as conducted in Example 1.

It can be seen that introducing a small quantity of mercaptosilane into the silica masterbatch further enhanced the properties of the silica masterbatch-based compounds, in particularly, the dynamic performance of the compounds. The introduction of a mercaptosilane into the silica masterbatch also improved the polymer-filler interaction as indicated from a lower Payne effect shown in FIG. 1 from the strain sweep measurement from the Rubber Process Analyzer (RPA) at 100° C.

Surprisingly, excellent compound properties were achieved from compound 1-C, where a combination of 50% silica pellet (Z1165 MP) and 50% silica powder (Z1165P), was used to prepare the silica masterbatch. A significant feature of using both silica pellets and powder, in combination with a mercaptosilane coupling agent, was much increased crumb size and reduced fine levels.

Example 2

This example demonstrates that using 100% silica pellets results in a dramatic increase in the crumb size and the elimination of fines that are critical for the down stream operations. This example also shows that very good silica dispersion is achieved and excellent compound properties obtained from the silica masterbatch approach even when 100% silica pellets are used for the preparation of the silica masterbatch.

In the procedure used, 3120 g of hexane and 1040 g of silica were charged into a 5-gallon reactor. The reactor was then heated. When the temperature of the hexane/silica slurry reached 95° C.-100° C., silane coupling agents were introduced. After 1 hour of reaction, 8196 g of SLF 28X42 SBR cement in hexane (20.8% solid) was blended into the reactor while maintaining the temperature. The mixture was then steam stripped off the solvent and dewatered and dried through screens and the Rocket.

Specifically, for Example 2-A, 100% of silica powder (Z1165P) and 83.2 g of Si266 were charged into the reactor. For Example 2-B, 50% Z1165 MP, 50% Z1165P and a blend of Si266/A189 (72.8 g of Si266 and 10.4 g of A189) were charged into the reactor. For Example 2-C, a 100% Z1165 MP and a blend of Si266 and A189 (72.8 g of Si266 and 10.4 g of A189) were used. The final composition of the silica masterbatch was as follows:

|  | 2-A | 2-B | 2-C |
|---|---|---|---|
| SLF 42X28 | 137.5 | 137.5 | 137.5 |
| Z1165 P | 83.3 | 41.6 |  |
| Z1165MP |  | 41.6 | 83.3 |
| Si266 | 6.67 | 5.83 | 5.83 |
| A189 |  | 0.83 | 0.83 |

The compound formulation is shown in Table 3. A reference compound with a small quantity of mercaptosilane was added for a direct comparison against a silica masterbatch with identical composition. A 1600 cc laboratory Banbury mixer was used to mix the compounds listed in Table 3. The properties of the five compounds are summarized in Table 4.

Figure 2:
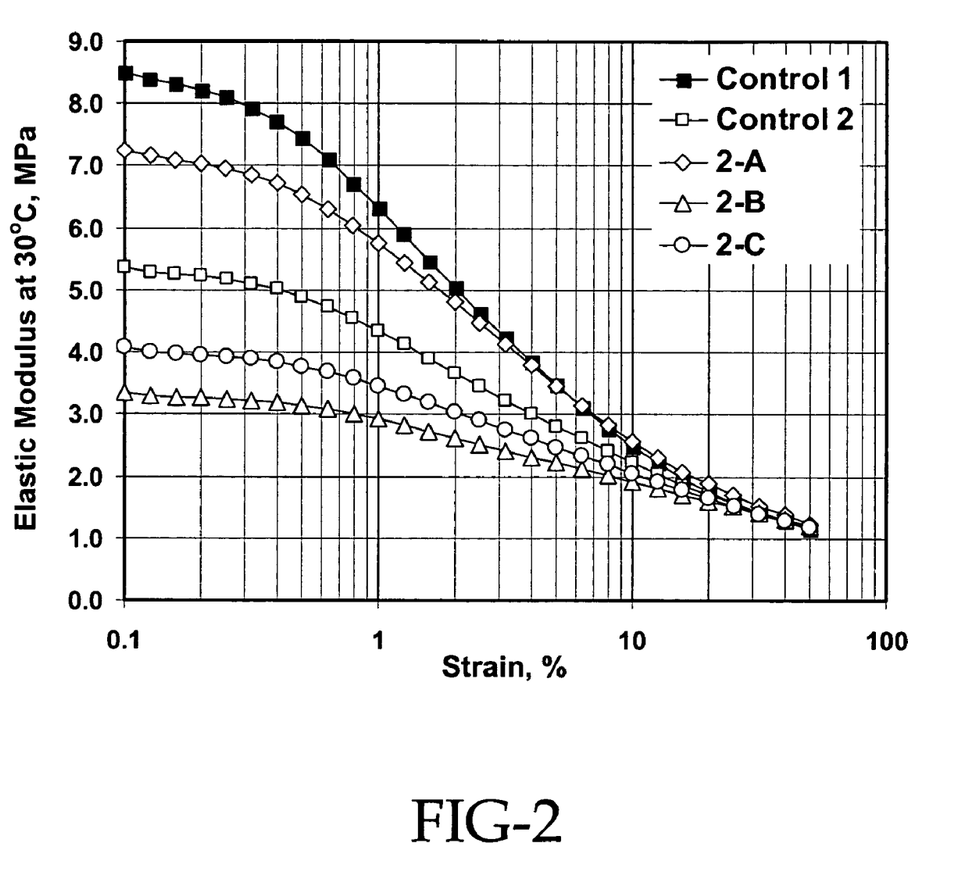
FIG. 2 shows that a much lower Payne effect is seen in silica masterbatch-based compounds, especially when a mercaptosilane is introduced, as conducted in Example 2.

As in the case of Example 1, compounds based on silica masterbatches prepared from the 5-gallon reactors exhibited excellent compound properties, especially when a mercaptosilane coupling agent was introduced. One of the most noticeable features of the silica masterbatch with a small quantity of a mercaptosilane was a much reduced Payne effect as shown from FIG. 2. The low Payne effect is an indication that introducing a small quantity of a mercaptosilane resulted in a much increased filler-polymer and much reduced filler-filler interactions.

It was found that introducing a small quantity of a mercaptosilane into a dry mixed compound also enhanced the performance of the silica compound. The level of performance enhancement is not, however, as dramatic as in the case of the silica masterbatch as shown in high temperature rebound and hysteresis at high temperatures (tan δ at 70° C.).

As can be seen from Table 4, silica masterbatches based on HD silica pellets also exhibited very good compound properties in comparison with dry mixed silica compounds. The additional advantage of using HD silica pellets is a significantly increased crumb size and a virtual elimination of fine in the silica masterbatch/water mixture after steam stripping, making it feasible to use conventional dewatering/drying devices such as shaker screens, expellers and expanders. The crumb sizes and fine levels from silica masterbatches prepared are listed in Table 5.

Figure 3:
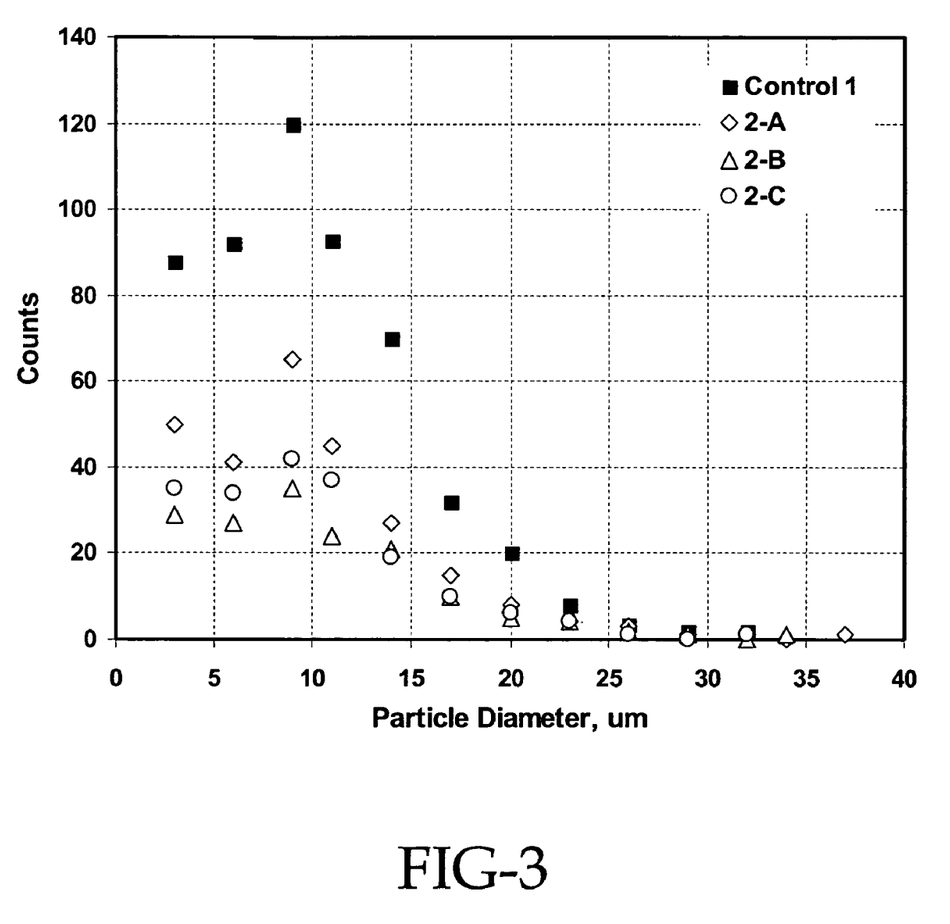
FIG. 3 shows that very good silica dispersion is achieved from the silica masterbatch approach even when 100% silica pellets (Z1165MP) is used (Dispergrader 1000 dispersion analysis), as conducted in Example 2.

As demonstrated from FIG. 3, much better silica dispersion was achieved in silica masterbatch-based compounds from 2-pass mixing in comparison with dry mix compounds from 3-pass mixing. No difference was seen in silica dispersion whether silica powder, a combination of silica powder and pellets or 100% silica pellets were used for the preparation of the silica masterbatch.

Example 3

This example illustrates the use of a mercaptosilane with an ethoxyl functionality, rather than a methoxyl functionality as is used in Examples 1 and 2, for the preparation of the silica masterbatch. For the purpose of comparison, a compound containing a blocked silane coupling agent, NXT silane, was also mixed with a Banbury using a two-pass mixing procedure.

In the procedure used, 3040 g of hexane and 1014 g of silica were charged into a 5-gallon reactor. The reactor was then heated. When the temperature of the hexane/silica slurry reached 95° C.-100° C., silane coupling agents were introduced. After 1 hour of reaction, 8320 g of SLF 28X42 SBR cement in hexane (20.8% solid) was blended into the reactor while maintaining the temperature. The mixture was then steam stripped off the solvent and dewatered and dried through screens and the Rocket.

For Example 3-A, 50% Z1165 MP and 50% Z1165P with A1891/Si266 (70.95 g of Si266 and 10.14 g of A1891) were charged into the reactor. For Example 3-B, 100% Z1165MP with A1891/Si266 (70.95 g of Si266 and 10.14 g of A1891) were used. The final composition of the silica masterbatch was as follows:

|  | 3-A | 3-B |
|---|---|---|
| SLF 42X28 | 137.5 | 137.5 |
| Z1165 P | 40 |  |
| Z1165MP | 40 | 80 |
| Si266 | 5.6 | 5.6 |
| A1891 | 0.8 | 0.8 |

The compound formulation is shown in Table 6. A 1600 cc laboratory Banbury mixer was used to mix the compounds: The properties of the four compounds are listed in Table 7. As in the case of silica masterbatches based on the methoxyl-based mercaptosilane, in comparison with silica compounds containing TESPD or NXT silane, compounds based on masterbatches containing a small quantity of an ethoxyl-based mercaptosilane exhibited very desirable compound properties, especially in tensile strength, high temperature rebound, hysteresis at high temperature (tan δ at 70° C.) and Payne effect. Due to the safety concern with methanol which will be released when the methoxyl-based mercaptosilane is used for the preparation of the silica masterbatch, the ethoxyl-based mercaptosilane is more preferred. However, when appropriate environmental protection devices are installed, a methoxyl-based mercaptosilane could be used to practice this invention to manufacture silica masterbatches with excellent compound performance.

Example 4

This example illustrates that excellent compound performance can still be achieved from the silica masterbatch when lower levels of a mercaptosilane are used for the preparation of the silica masterbatch.

In the procedure used, 3393 g of hexane and 1014 g of silica were charged into a 5-gallon reactor. The reactor was then heated. When the temperature of the hexane/silica slurry reached 95° C.-100° C., silane coupling agents were introduced. After 1 hour of reaction, 8320 g of SLF 28X42 SBR cement in hexane (20.8% solid) was blended into reactor while maintaining the temperature. The mixture was then steam stripped off the solvent and dewatered and dried through screens and the Rocket.

Specifically, for Example 4-A, 50% Z1165MP and 50% Z1165P with A1891/Si266 (73.99 g of Si266 and 7.1 g of A1891) were charged into the reactor. For Example 3-B, 100% Z1165MP with A1891/Si266 (73.99 g of Si266 and 7.1 g of A1891) were used. The final composition of the silica masterbatch was as follows:

|  | 4-A | 4-B |
|---|---|---|
| SLF 42X28 | 137.5 | 137.5 |
| Z1165 P | 40 |  |
| Z1165MP | 40 | 80 |
| Si266 | 5.84 | 5.84 |
| A1891 | 0.56 | 0.56 |

The compound formulation is present in Table 8. The compound properties of the three compounds are summarized in Table 9. It can be seen that very good compound properties, especially dynamic properties, were still obtained from silica masterbatch at a low level of A1891 loading, even though the enhancement in tensile properties (M300/M100 ratio) was not as significant as when higher loading of A1891 is used.

Example 5

This example illustrates that the effect of very low loading of a mercaptosilane on the performance of silica masterbatch-based compounds. The two silane coupling agents were added in different sequences in this example.

In the procedure used, 3393 g of hexane and 1014 g of silica (a 50% Z1165P and 50% Z1165MP) were charged into a 5-gallon reactor. The reactor was then heated. When the temperature of the hexane/silica slurry reached 95° C.-100° C., a blend of Si266 and A1891 silane coupling agents (x g of Si266 and x g of A1891) were introduced. For Example 5-A, A1891 was added first and Si266 is added 30 minutes later. For Example 5-B, Si266 and A1891 were added together at the beginning. For Example 5-C, Si266 was added at the beginning and A1891 was added 30 minutes later. After 1 hour of reaction, 8320 g of SLF 28X42 SBR cement in hexane (20.8% solid) was blended into reactor while maintaining the temperature. The mixture was then steam stripped off the solvent and dewatered and dried through screens and the Rocket. The final composition of the silica masterbatch was as follows:

|  | 5-A | 5-B | 5-C |
|---|---|---|---|
| SLF 42X28 | 137.5 | 137.5 | 137.5 |
| Z1165 P | 40 | 40 | 40 |
| Z1165MP | 40 | 40 | 40 |
| Si266 | 6.0 | 6.0 | 6.0 |
| A1891 | 0.40 | 0.40 | 0.40 |

The properties of the three silica compounds together with the dry mixing reference are summarized in Table 10. The compound formulation used in this Example is the same as in Table 8. It can be seen that silica masterbatch-based compound exhibited better overall dynamic performance even at very low level of the mercaptosilane in comparison with dry mix compounds. Adding A1891 at the beginning resulted in slightly better dynamic performance.

TABLE 1

Compound Formulations

| | 1 | 2 | 3 | 4 |
|---|---|---|---|---|
| | | Compound No. | | |
| | Control 1 | 2-A | 2-B | 2-C |
| | Non-Productive | | | |
| SLF 28X42 | 137.5 | | | |
| Ex. 1-A | | 223.9 | | |
| Ex. 1-B | | | 223.9 | |
| Ex. 1-C | | | | 223.9 |
| Silica Z1165MP | 80.0 | | | |
| Si266 | 6.40 | | | |
| Microcrystalline wax | 1.0 | 1.0 | 1.0 | 1.0 |
| Refined Paraffin wax | 0.5 | 0.5 | 0.5 | 0.5 |
| Wingstay 300 | 2.0 | 2.0 | 2.0 | 2.0 |
| Stearic acid | 2.0 | 2.0 | 2.0 | 2.0 |
| | Productive | | | |
| Polystay 100 | 1.0 | 1.0 | 1.0 | 1.0 |
| Zinc Oxide | 2.5 | 2.5 | 2.5 | 2.5 |
| CBS | 2.0 | 2.0 | 2.0 | 2.0 |
| DPG | 1.8 | 1.8 | 1.8 | 1.8 |
| Sulfur | 2.0 | 2.0 | 2.0 | 2.0 |
| Total phr. | 238.7 | 238.7 | 238.7 | 238.7 |

SLF 28X42 is a solution SBR from The Goodyear Tire & Rubber Company with a styrene content of about 28% and a vinyl content of about 42%. The elastomer is extended with 37.5 phr of oil.

TABLE 2

Compound Properties

| | 1 | 2 | 3 | 4 |
|---|---|---|---|---|
| Properties | Control | 1-A | 1-B | 1-C |
| Silica Used | 100% MP | 100% P | 100% P | 50% MP/50% P |
| Si266 loading, phr | 6.4 | 6.4 | 5.8 | 5.8 |
| A189 loading, phr | — | — | 0.6 | 0.6 |
| Mixing pass | 3 | 2 | 2 | 2 |
| Processing | | | | |
| G' @100° C./15%, MPa | 0.219 | 0.236 | 0.236 | 0.253 |
| Tensile Properties | | | | |
| 100% Modulus, MPa | 2.43 | 2.70 | 2.80 | 2.56 |
| 300% Modulus, MPa | 13.60 | 17.12 | 17.81 | 17.09 |
| Tensile Strength, MPa | 21.51 | 20.92 | 19.97 | 19.98 |
| Elongation at Break, % | 483 | 396 | 383 | 390 |
| 300%/100% M. Ratio | 5.59 | 6.34 | 6.36 | 6.69 |

TABLE 2-continued

Compound Properties

| | 1 | 2 | 3 | 4 |
|---|---|---|---|---|
| Properties | Control | 1-A | 1-B | 1-C |
| RPA Strain Sweep at 100° C. | | | | |
| G' 1%, MPa | 2.26 | 1.81 | 1.64 | 1.62 |
| G' 40%, MPa | 0.86 | 0.94 | 0.89 | 0.89 |
| G' 1% – G' 40%, MPa | 1.40 | 0.88 | 0.75 | 0.73 |
| tanδ at 10% | 0.124 | 0.102 | 0.098 | 0.099 |
| RDS Strain Sweep at 30° C. | | | | |
| G' 0.1%, MPa | 3.18 | 2.12 | 2.04 | 2.08 |
| G' 50%, MPa | 1.03 | 1.04 | 1.03 | 1.01 |
| G' 0.1% – G' 50%, MPa | 2.15 | 1.09 | 1.01 | 1.06 |
| tanδ max | 0.277 | 0.248 | 0.236 | 0.239 |
| RSA Temp. Sweep at 11 Hz | | | | |
| E' @ –20° C., MPa | 919.90 | 812.30 | 677.70 | 747.30 |
| tanδ @ 0° C. | 0.454 | 0.546 | 0.522 | 0.544 |
| tanδ @ 70° C. | 0.085 | 0.072 | 0.062 | 0.067 |
| DIN Abrasion | | | | |
| Rel. Volume Loss, mm$^3$ | 164 | 131 | 144 | 146 |
| Specific Gravity | | | | |
| Compound | 1.185 | 1.185 | 1.185 | 1.178 |

TABLE 3

Compound Formulation

| | 1 | 2 | 3 | 4 | 5 |
|---|---|---|---|---|---|
| Compound No. | Control 1 | Control 2 | 2-A | 2-B | 2-C |
| | Non-Productive | | | | |
| SLF 28X42 | 137.5 | 137.5 | | | |
| Ex. 2-A | | | 227.1 | | |
| Ex. 2-B | | | | 227.1 | |
| Ex. 2-C | | | | | 227.1 |
| Silica Z1165MP | 83.0 | 83.0 | | | |
| Si266 | 6.64 | 5.81 | | | |
| A189 | | 0.83 | | | |
| Microcrystalline wax | 1.0 | 1.0 | 1.0 | 1.0 | 1.0 |
| Refined Paraffin wax | 0.5 | 0.5 | 0.5 | 0.5 | 0.5 |
| Wingstay 300 | 2.0 | 2.0 | 2.0 | 2.0 | 2.0 |
| Stearic acid | 2.0 | 2.0 | 2.0 | 2.0 | 2.0 |
| | Productive | | | | |
| Polystay 100 | 1.0 | 1.0 | 1.0 | 1.0 | 1.0 |
| Zinc Oxide | 2.5 | 2.5 | 2.5 | 2.5 | 2.5 |
| CBS | 2.0 | 2.0 | 2.0 | 2.0 | 2.0 |
| DPG | 1.8 | 1.8 | 1.8 | 1.8 | 1.8 |
| Sulfur | 2.0 | 2.0 | 2.0 | 2.0 | 2.0 |
| Total phr. | 241.9 | 241.9 | 241.9 | 241.9 | 241.9 |

TABLE 4

Compound Properties

| Properties | 1<br>Control 1 | 2<br>Control 2 | 3<br>2-A | 4<br>2-B | 5<br>2-C |
|---|---|---|---|---|---|
| Si266 Loading, phr | 6.64 | 5.81 | 6.64 | 5.81 | 5.81 |
| A189 Loading, phr |  | 0.83 |  | 0.83 | 0.83 |
| Silica | 100% MP | 100% MP | 100% P | 50% P/50% MP | 100% MP |
| Mixing Pass | 3 | 3 | 2 | 2 | 2 |
| Processing |  |  |  |  |  |
| Mooney ML(1 + 4) at 100° C. | 83 | 85 | 98 | 98 | 98 |
| G' @ 100° C./15%, MPa | 0.219 | 0.194 | 0.248 | 0.265 | 0.265 |
| Tensile Properties |  |  |  |  |  |
| 100% Modulus, MPa | 1.71 | 1.74 | 1.74 | 1.84 | 1.79 |
| 300% Modulus, MPa | 9.37 | 11.18 | 10.30 | 14.71 | 12.68 |
| Tensile Strength, MPa | 18.00 | 19.21 | 18.06 | 15.00 | 14.91 |
| Elongation at Break, % | 491 | 452 | 450 | 323 | 349 |
| M300/M100 Ratio | 5.48 | 6.43 | 5.92 | 7.99 | 7.08 |
| Shore A Hardness |  |  |  |  |  |
| 25° C. | 71 | 68 | 72 | 65 | 65 |
| 100° C. | 62 | 59 | 61 | 56 | 56 |
| Rebound, % |  |  |  |  |  |
| 25° C. | 17 | 17 | 16 | 18 | 18 |
| 100° C. | 57 | 61 | 57 | 64 | 63 |
| RPA Strain Sweep at 100° C. |  |  |  |  |  |
| G' 1%, MPa | 4.668 | 3.389 | 4.044 | 2.205 | 2.586 |
| G' 40%, MPa | 1.099 | 1.034 | 0.981 | 1.084 | 1.024 |
| G' 1%-G' 40%, MPa | 3.569 | 2.355 | 3.063 | 1.121 | 1.562 |
| G' 40%/G' 1% | 0.235 | 0.305 | 0.243 | 0.492 | 0.396 |
| tanδ at 10% | 0.132 | 0.112 | 0.122 | 0.096 | 0.105 |
| RDS Strain Sweep at 30° C. |  |  |  |  |  |
| G' 0.1%, MPa | 8.505 | 5.363 | 7.251 | 3.357 | 4.077 |
| G' 50%, MPa | 1.141 | 1.180 | 1.237 | 1.207 | 1.176 |
| G' 0.1%-G' 50%, MPa | 7.364 | 4.183 | 6.014 | 2.150 | 2.901 |
| G' 0.1%G' 50%/G' 0.1% | 0.134 | 0.220 | 0.171 | 0.360 | 0.288 |
| tanδ max | 0.340 | 0.297 | 0.333 | 0.273 | 0.289 |
| RSA Temp. Sweep at 11 Hz |  |  |  |  |  |
| E' @ −20° C., MPa | 934.0 | 892.0 | 1011.0 | 859.0 | 759.0 |
| tanδ @ 0° C. | 0.329 | 0.390 | 0.353 | 0.465 | 0.419 |
| tanδ @ 70° C. | 0.102 | 0.098 | 0.096 | 0.071 | 0.076 |
| DIN Abrasion |  |  |  |  |  |
| Rel. Volume Loss, mm³ | 158 | 122 | 163 | 133 | 136 |
| Specific Gravity |  |  |  |  |  |
| Compound | 1.191 | 1.195 | 1.192 | 1.191 | 1.190 |

TABLE 5

% Fine and Average Crumb Size

| Sample Composition (phr) | % Fine | Av. Crumb Size (mm) |
|---|---|---|
| 83.3 MP, 0.6 A-189, 6.0 Si266 | 0.01 | 7.5 |
| 83.3 P, 0.6 A-189, 6.0 Si266 | 0.44 | 2 |
| 41.6 MP, 41.6 P, 0.6 A-189, 6.0 Si266 | 0.1 | 3.5 |
| 83.3 P, 0 A-189, 6.6 Si266 | 1.1-11.3 | 0.75-1.05 |
| 83.3 P, 3.3 A-189, 0 Si266 | 0.072 | 2.5 |

137.5 phr of SLF 28X42 is used to prepare the silica masterbatches MP=Z1165MP, P=Z1165P, Fine=Crumb Size Less Than 0.55 mm

TABLE 6

Compound Formulation

|  | 1 | 2 | 3 | 4 |
|---|---|---|---|---|
|  | Compound No. | | | |
|  | Control 1 | Control 2 | 3-A | 3-B |
| Non-Productive | | | | |
| SLF 28X42 | 137.5 | 137.5 |  |  |
| Ex. 3-A |  |  | 223.9 |  |
| Ex. 3-B |  |  |  | 223.9 |
| Silica Z1165MP | 80.0 | 80.0 |  |  |
| Si266 | 6.40 |  |  |  |
| NXT Silane |  | 6.80 |  |  |
| Microcrystalline wax | 1.0 | 1.0 | 1.0 | 1.0 |
| Refined Paraffin wax | 0.5 | 0.5 | 0.5 | 0.5 |
| Wingstay 300 | 2.0 | 2.0 | 2.0 | 2.0 |
| Stearic acid | 2.0 | 2.0 | 2.0 | 2.0 |

TABLE 6-continued

Compound Formulation

| | 1 | 2 | 3 | 4 |
|---|---|---|---|---|
| | | Compound No. | | |
| | Control 1 | Control 2 | 3-A | 3-B |
| | | Productive | | |
| Polystay 100 | 1.0 | 1.0 | 1.0 | 1.0 |
| Zinc Oxide | 2.5 | 2.5 | 2.5 | 2.5 |
| CBS | 2.0 | 2.0 | 2.0 | 2.0 |
| DPG | 1.8 | 1.8 | 1.8 | 1.8 |
| Sulfur | 1.6 | 1.6 | 1.6 | 1.6 |
| Total phr. | 238.3 | 238.7 | 238.3 | 238.3 |

TABLE 7

Compound Properties

| Properties | 1 Control 1 | 2 Control 2 | 3 3-A | 4 3-B |
|---|---|---|---|---|
| Si266 Loading, phr | 6.4 | | 5.6 | 5.6 |
| A1891 Loading, phr | | | 0.8 | 0.8 |
| NXT Loading, phr | | 6.8 | | |
| Silica | 100% MP | 100% MP | 50% P/50% MP | 100% MP |
| Mixing Procedure | 3 | 2 | 2 | 2 |
| Processing | | | | |
| Mooney ML(1 + 4) at 100° C. | 86 | 94 | 90 | 91 |
| G' @100° C./15%, MPa | 0.220 | 0.270 | 0.240 | 0.241 |
| Tensile Properties | | | | |
| 100% Modulus, MPa | 1.55 | 1.55 | 1.40 | 1.39 |
| 300% Modulus, MPa | 8.79 | 7.68 | 9.63 | 9.65 |
| Tensile Strength, MPa | 16.24 | 17.99 | 19.32 | 19.87 |
| Elongation at Break, % | 469 | 555 | 474 | 477 |
| M300/M100 Ratio | 5.67 | 4.95 | 6.88 | 6.94 |
| Shore A Hardness | | | | |
| 25° C. | 68 | 68 | 63 | 61 |
| 100° C. | 59 | 60 | 54 | 53 |
| Rebound, % | | | | |
| 25° C. | 17 | 20 | 18 | 19 |
| 100° C. | 57 | 57 | 60 | 61 |
| RPA Strain Sweep at 100° C. | | | | |
| G' 1%, MPa | 4.589 | 5.160 | 2.867 | 2.455 |
| G' 40%, MPa | 1.057 | 1.129 | 0.995 | 0.975 |
| G' 1% − G' 40%, MPa | 3.532 | 4.031 | 1.871 | 1.480 |
| G' 40%/G' 1% | 0.230 | 0.219 | 0.347 | 0.397 |
| tanδ at 10% | 0.178 | 0.172 | 0.156 | 0.147 |
| RDS Strain Sweep at 30° C. | | | | |
| G' 0.1%, MPa | 4.901 | 6.520 | 3.465 | 2.831 |
| G' 50%, MPa | 1.022 | 1.059 | 1.040 | 0.947 |
| G' 0.1% − G' 50%, MPa | 4.861 | 5.461 | 2.425 | 1.884 |
| tanδ max | 0.318 | 0.272 | 0.279 | 0.273 |
| RSA Temp. Sweep at 11 Hz | | | | |
| E' @ −20° C., MPa | 802 | 617 | 697 | 743 |
| tanδ @ 0° C. | 0.312 | 0.331 | 0.358 | 0.426 |
| tanδ @ 70° C. | 0.103 | 0.097 | 0.083 | 0.082 |
| DIN Abrasion | | | | |
| Rel. Volume Loss, mm³ | 152 | 176 | 152 | 160 |

TABLE 7-continued

Compound Properties

| Properties | 1 Control 1 | 2 Control 2 | 3 3-A | 4 3-B |
|---|---|---|---|---|
| Specific Gravity | | | | |
| Compound | 1.194 | 1.211 | 1.203 | 1.184 |

TABLE 8

Compound Formulation

| | 1 | 2 | 3 |
|---|---|---|---|
| | | Compound No. | |
| | Control 1 | 4-A | 4-B |
| | | Non-Productive | |
| SLF 28X42 | 137.5 | | |
| Ex. 4-A | | 223.9 | |
| Ex. 4-B | | | 223.9 |
| Silica Z1165MP | 80.0 | | |
| Si266 | 6.40 | | |
| Microcrystalline wax | 1.0 | 1.0 | 1.0 |
| Refined Paraffin wax | 0.5 | 0.5 | 0.5 |
| Wingstay 300 | 2.0 | 2.0 | 2.0 |
| Stearic acid | 2.0 | 2.0 | 2.0 |
| | | Productive | |
| Polystay 100 | 1.0 | 1.0 | 1.0 |
| Zinc Oxide | 2.5 | 2.5 | 2.5 |
| CBS | 2.0 | 2.0 | 2.0 |
| DPG | 1.8 | 1.8 | 1.8 |
| Sulfur | 1.6 | 1.6 | 1.6 |
| Total phr. | 238.3 | 238.3 | 238.3 |

TABLE 9

Compound Properties

| Properties | 1 Control | 2 4-A | 3 4-B |
|---|---|---|---|
| Si266 Loading, phr | 6.4 | 5.84 | 5.84 |
| A1891 Loading, phr | | 0.56 | 0.56 |
| Silica | 100% MP | 50% P/50% MP | 100% MP |
| Mixing Pass | 3 | 2 | 2 |
| Processing | | | |
| Mooney ML(1 + 4) at 100° C. | 81 | 84 | 88 |
| G' @100° C./15%, MPa | 0.217 | 0.248 | 0.249 |
| Tensile Properties | | | |
| 100% Modulus, MPa | 1.87 | 1.73 | 1.74 |
| 300% Modulus, MPa | 10.45 | 10.53 | 10.60 |
| Tensile Strength, MPa | 18.93 | 17.86 | 18.96 |
| Elongation at Break, % | 479 | 433 | 450 |
| 300%/100% M. Ratio | 5.60 | 6.09 | 6.09 |
| Shore A Hardness | | | |
| 25° C. | 70 | 64 | 65 |
| 100° C. | 63 | 57 | 59 |
| Rebound, % | | | |
| 25° C. | 15 | 19 | 17 |
| 100° C. | 57 | 61 | 61 |

TABLE 9-continued

| | Compound Properties | | |
|---|---|---|---|
| Properties | 1 Control | 2 4-A | 3 4-B |
| RPA Strain Sweep at 100° C. | | | |
| G' 1%, MPa | 3.47 | 2.229 | 2.629 |
| G' 40%, MPa | 0.87 | 0.762 | 0.815 |
| G' 1% − G' 40%, MPa | 2.60 | 1.47 | 1.81 |
| tanδ at 10% | 0.159 | 0.129 | 0.135 |
| RDS Strain Sweep at 30° C. | | | |
| G' 0.1%, MPa | 6.300 | 3.950 | 4.120 |
| G' 50%, MPa | 1.070 | 1.050 | 1.130 |
| G' 0.1% − G' 50%, MPa | 5.230 | 2.900 | 2.990 |
| tanδ max | 0.362 | 0.295 | 0.309 |
| RSA Temp. Sweep at 11 Hz | | | |
| E' @ −20° C., MPa | 2615 | 1921 | 2180 |
| tanδ @ 0° C. | 0.710 | 0.666 | 0.686 |
| tanδ @ 70° C. | 0.111 | 0.097 | 0.083 |
| DIN Abrasion | | | |
| Rel. Volume Loss, mm$^3$ | 152 | 121 | 152 |
| Specific Gravity | | | |
| Compound | 1.194 | 1.183 | 1.186 |

TABLE 10

| | Compound Properties | | | |
|---|---|---|---|---|
| Properties | 1 Control | 2 5-A | 3 5-B | 4 5-C |
| Si266 Loading, phr | 6.4 | 6.0 | 6.0 | 6.0 |
| A1891 Loading, phr | | 0.4 | 0.4 | 0.4 |
| Silica | 100% MP | 50% P/50% MP | 50% P/50% MP | 50% P/50% MP |
| Mixing Passes | 3 | 2 | 2 | 2 |
| Processing | | | | |
| Mooney ML(1 + 4) at 100° C. | 83 | 95 | 92 | 91 |
| G' @100° C./15%, MPa | 0.225 | 0.272 | 0.257 | 0.256 |
| Tensile Properties | | | | |
| 100% Modulus, MPa | 1.97 | 1.76 | 1.66 | 1.69 |
| 300% Modulus, MPa | 12.22 | 11.83 | 10.23 | 10.87 |
| Tensile Strength, MPa | 18.12 | 15.47 | 16.73 | 17.61 |
| Elongation at Break, % | 422 | 373 | 428 | 427 |
| M300/M100 Ratio | 6.20 | 6.72 | 6.16 | 6.43 |
| Shore A Hardness | | | | |
| 25° C. | 69 | 66 | 67 | 67 |
| 100° C. | 60 | 58 | 59 | 57 |
| Rebound, % | | | | |
| 25° C. | 15 | 17 | 17 | 17 |
| 100° C. | 60 | 62 | 60 | 61 |
| RPA Strain Sweep at 100° C. | | | | |
| G' 1%, MPa | 3.104 | 2.625 | 2.612 | 2.754 |
| G' 40%, MPa | 0.859 | 0.839 | 0.775 | 0.799 |
| G' 1% − G' 40%, MPa | 2.246 | 1.786 | 1.837 | 1.956 |
| tanδ at 10% | 0.150 | 0.134 | 0.148 | 0.146 |
| RDS Strain Sweep at 30° C. | | | | |
| G' 0.1%, MPa | 6.200 | 3.620 | 4.030 | 3.980 |
| G' 50%, MPa | 1.090 | 1.030 | 1.050 | 1.060 |
| G' 0.1% − G' 50%, MPa | 4.330 | 2.590 | 2.980 | 2.920 |
| tanδ max | 0.370 | 0.314 | 0.313 | 0.319 |
| RDS Temp. Sweep at 11 Hz | | | | |
| G' @ −20° C., MPa | 789 | 813 | 795 | 765 |
| tanδ @ 0° C. | 0.259 | 0.432 | 0.446 | 0.390 |
| tanδ @ 70° C. | 0.159 | 0.127 | 0.125 | 0.148 |

TABLE 10-continued

| | Compound Properties | | | |
|---|---|---|---|---|
| Properties | 1 Control | 2 5-A | 3 5-B | 4 5-C |
| DIN Abrasion | | | | |
| Rel. Volume Loss, mm³ | 185 | 166 | 176 | 187 |
| Specific Gravity | | | | |
| Compound | 1.193 | 1.190 | 1.187 | 1.188 |

The disclosed invention could be used to produce silica masterbatches with enhanced compound performance. The use of the disclosed approach would also result in a simplified process for the production of the silica masterbatch by eliminating the treatment polymer for the silica masterbatch.

While certain representative embodiments and details have been shown for the purpose of illustrating the subject invention, it will be apparent to those skilled in this art that various changes and modifications can be made therein without departing from the scope of the subject invention.

What is claimed is:

1. A process for preparing a silica/rubber blend which comprises dispersing a slurry of silica throughout a cement of a rubbery polymer, wherein the slurry of silica is made by dispersing (1) a first silica coupling agent having the structural formula Z-Alk-SH, (2) a second silica coupling agent having a structural formula selected from the group consisting of Z-Alk-$S_n$-Alk-Z, Z-Alk-$S_n$-Alk, Z-Alk, and Si(OR¹)₄, and (3) the silica throughout an organic solvent, and subsequently recovering the silica/rubber blend from the organic solvent, wherein the first silica coupling agent having the structural formula Z-Alk-SH is present at a level of 1 weight percent to 20 weight percent, based upon the total amount of the first silica coupling agent and the second silica coupling agent utilized in making the silica/rubber blend.

2. A process for preparing a silica/rubber blend which comprises (1) dispersing (a) a first silica coupling agent having the structural formula Z-Alk-SH, (b) a second silica coupling agent having a structural formula selected from the group consisting of Z-Alk-$S_n$-Alk-Z, Z-Alk-$S_n$-Alk, Z-Alk, and Si(OR¹)₄, and (c) the silica throughout an organic solvent to make a slurry of silica, (2) dispersing the slurry of silica throughout a cement of a rubbery polymer, and (3) recovering the silica/rubber blend from the cement, wherein the first silica coupling agent having the structural formula Z-Alk-SH is present at a level of 1 weight percent to 20 weight percent, based upon the total amount of the first silica coupling agent and the second silica coupling agent utilized in making the silica/rubber blend.

3. A silica/rubber blend made by the process specified in claim 1.

4. A process as specified in claim 1 wherein the silica present is at a level which is within the range of 40 phr to 200 phr.

5. A process as specified in claim 4 wherein the total amount of silica coupling agent present is at a level which is within the range of 2 phr to 40 phr.

6. A process as specified in claim 1 wherein the first silica coupling agent having the structural formula Z-Alk-SH is present at a level of 4 weight percent to 15 weight percent, based upon the total amount of the first silica coupling agent and the second silica coupling agent utilized in making the silica/rubber blend.

7. A process as specified in claim 6 wherein the silica present is at a level which is within the range of 50 phr to 150 phr.

8. A process as specified in claim 7 wherein the total amount of silica coupling agent present is at a level which is within the range of 3 phr to 15 phr.

9. A process as specified in claim 1 wherein the first silica coupling agent having the structural formula Z-Alk-SH is present at a level of 6 weight percent to 13 weight percent, based upon the total amount of the first silica coupling agent and the second silica coupling agent utilized in making the silica/rubber blend.

10. A process as specified in claim 9 wherein the total amount of silica coupling agent present is at a level which is within the range of 4 phr to 8 phr.

11. A process as specified in claim 10 wherein the silica present is at a level which is within the range of 50 phr to 150 phr.

12. A process as specified in claim 1 wherein the silica/rubber blend is recovered from the organic solvent by steam stripping.

13. A process for preparing a silica/rubber blend which comprises dispersing a slurry of silica throughout a cement of a rubbery polymer, wherein the slurry of silica is made by dispersing (1) a first silica coupling agent having the structural formula Z-Alk-SH, (2) a second silica coupling agent having a structural formula selected from the group consisting of Z-Alk-$S_n$-Alk-Z, Z-Alk-$S_n$-Alk Z-Alk, and Si(OR¹)₄, and (3) the silica throughout an organic solvent, wherein the silica which is dispersed throughout the organic solvent is in the form of pellets, and subsequently recovering the silica/rubber blend from the organic solvent.

14. A process as specified in claim 1 wherein the slurry of silica is dispersed throughout the cement of the rubbery polymer at a temperature which is within the range of 25° C. to 170° C.

15. A process as specified in claim 1 which further comprises dispersing an extending oil into the cement of the rubbery polymer.

16. A process as specified in claim 15 wherein 10 phr to 45 phr of the extending oil is dispersed into the cement of the rubbery polymer.

17. A process as specified in claim 14 wherein the cement of the rubbery polymer contains from about 5 weight percent to about 30 weight percent of the rubbery polymer.

18. A process as specified in claim 1 wherein the silica has a BET surface area which is within the range of 50 to 300 m² g.

19. A tire having a tread wherein said tread is comprised of the silica/rubber blend specified in claim 3.

20. A process as specified in claim 13 wherein the silica present is at a level which is within the range of 40 phr to 200 phr.

21. A process as specified in claim 13 wherein the total amount of silica coupling agent present is at a level which is within the range of 2 phr to 40 phr.

* * * * *